US006951274B2

(12) United States Patent
Zeitler et al.

(10) Patent No.: US 6,951,274 B2
(45) Date of Patent: Oct. 4, 2005

(54) TIERED CONTROL ARCHITECTURE FOR MATERIAL HANDLING

(75) Inventors: David W. Zeitler, Gainesville Township, MI (US); Andrew R. Black, Fremont, MI (US); Clyde Miin-Arng Ko, Ada, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 212 days.

(21) Appl. No.: 10/163,788

(22) Filed: Jun. 6, 2002

(65) Prior Publication Data

US 2002/0185358 A1 Dec. 12, 2002

Related U.S. Application Data

(60) Provisional application No. 60/296,628, filed on Jun. 7, 2001.

(51) Int. Cl.[7] .............................................. B65G 47/10
(52) U.S. Cl. ................ 198/890; 198/370.02; 198/890.1
(58) Field of Search ........................... 198/890, 370.02, 198/890.1, 370.03, 370.01, 370, 349, 355, 370.07, 370.08

(56) References Cited

U.S. PATENT DOCUMENTS

| 2,868,394 | A | * | 1/1959 | Greller et al. ................. 214/11 |
| 3,333,675 | A | * | 8/1967 | Lord ............................ 198/28 |
| 3,361,247 | A | * | 1/1968 | Lauzon et al. ................ 198/38 |
| 4,738,347 | A |   | 4/1988 | Brouwer et al. |

(Continued)

FOREIGN PATENT DOCUMENTS

| WO | 0031597 | 6/2000 |
| WO | 0101301 | 1/2001 |
| WO | 0136307 | 5/2001 |

OTHER PUBLICATIONS

Copy of commonly–assigned, pending U.S. Appl. No. 09/968,742, filed Sep. 28, 2001 entitled: Positive Displacement Shoe and Slat Sorter Apparatus and Method.
Copy of commonly–assigned, pending U.S. Appl. No. 09/840,639, filed Apr. 23, 2001 entitled: Sortation System Diverter Switch.
Copy of commonly–assigned, pending U.S. Appl. No. 10/209,766, filed Jul. 31, 2002 entitled: Material Handling Systems With High Frequency Radio Location Devices.
International Search Report mailed May 30, 2003 for application PCT/EP02/06229, which is the foreign counterpart to the present application.
Commonly assigned co–pending U.S. Appl. No. 09/968, 742, filed Sep. 28, 2001, entitled Positive Displacement Shoe and Slat Sorter Apparatus and Method (P–574B).

*Primary Examiner*—Kathy Matecki
*Assistant Examiner*—Rashmi Sharma
(74) *Attorney, Agent, or Firm*—Van Dyke, Gardner, Linn & Burkhart, LLP

(57) ABSTRACT

A control architecture for material handling includes multiple tiers of controllers, such as three. The lowest-level controllers interact directly with sensors and actuators used in the material handling system, such as photo-eyes and motors used with conveyors. The lowest-level controllers receive higher level commands from one or more mid-level controllers. The mid-level controllers, in turn, receive still higher level commands and information from at least one upper level controller. Each mid and low level controller is designed to include sufficient intelligence to deal with many of the signals and messages it receives without having to forward those signals or messages to the next higher level controller and await instructions from that higher level controller. The system thus distributes intelligence amongst the controllers. The system is well-adapted for application to conveyor control systems.

27 Claims, 10 Drawing Sheets

U.S. PATENT DOCUMENTS

| | | | |
|---|---|---|---|
| 5,038,912 A | 8/1991 | Cotter | |
| 5,127,510 A | 7/1992 | Cotter et al. | |
| 5,165,515 A | 11/1992 | Nitschke et al. | |
| 5,967,289 A | 10/1999 | Kelsey | |
| 5,971,132 A | 10/1999 | Bonnet | |
| 6,041,909 A | 3/2000 | Shearer, Jr. | |
| 6,044,956 A * | 4/2000 | Henson et al. | 198/370.02 |
| 6,068,105 A * | 5/2000 | Darwish et al. | 198/370.02 |
| 6,139,240 A * | 10/2000 | Ando | 414/267 |
| 6,157,866 A | 12/2000 | Conboy et al. | |
| 6,318,539 B1 * | 11/2001 | Bonnet | 198/370.02 |
| 6,345,217 B1 | 2/2002 | Zeitler et al. | |
| 6,478,144 B1 * | 11/2002 | Sweazy | 198/890 |
| 6,543,602 B1 * | 4/2003 | Bonnet | 198/370.03 |
| 6,615,972 B2 * | 9/2003 | Veit et al. | 198/370.02 |

* cited by examiner

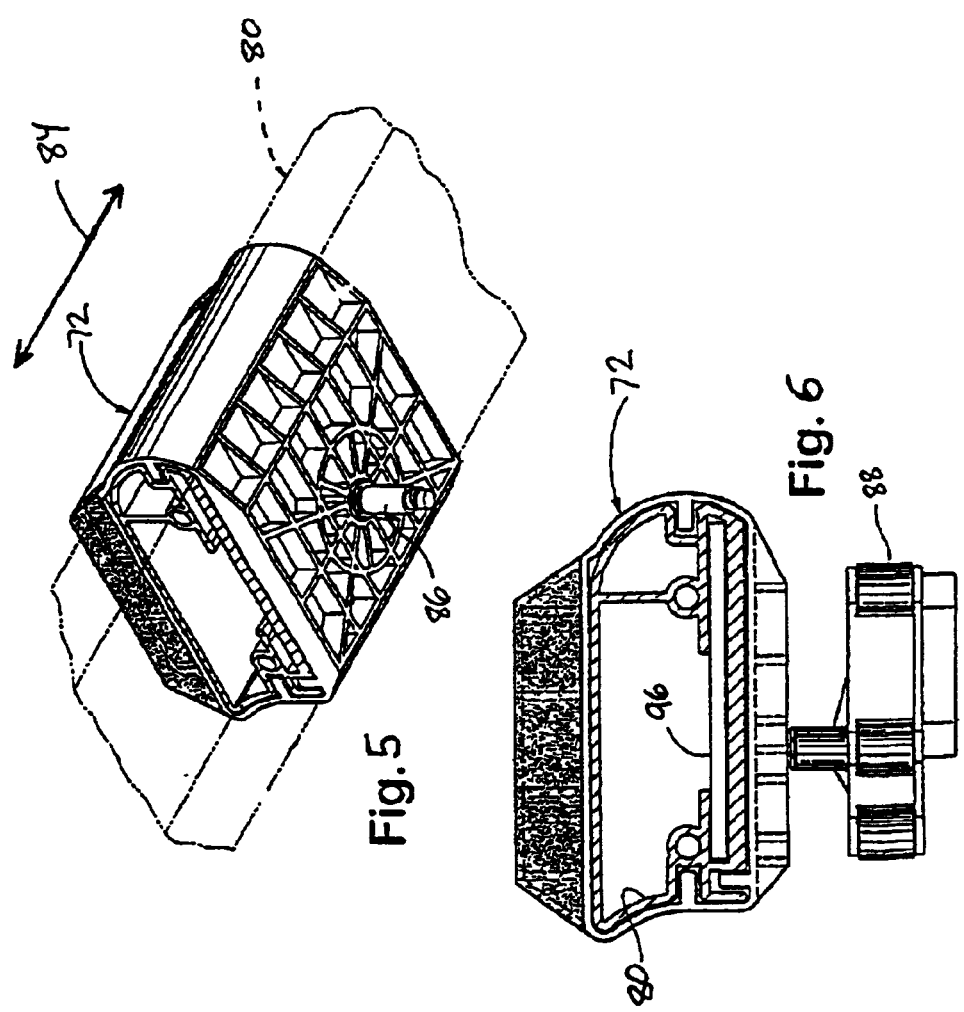

TIERED CONTROL ARCHITECTURE FOR MATERIAL HANDLING

This application claims priority to commonly-assigned, U.S. provisional application Ser. No. 60/296,628, filed Jun. 7, 2001, entitled Layered Control Architecture for Material Handling, the disclosure of which is hereby incorporated herein by reference.

BACKGROUND OF THE INVENTION

This invention generally relates to control systems, and more particularly to the architecture of a control system for controlling material handling operations.

Automated material handling systems are available in a wide variety of forms, such as conveyor systems, automatic guided vehicles, electrified monorails, automatic storage and retrieval systems, and others. In the past, these types of material handling systems have been controlled by control systems having generally one of two different types of architecture. In one architecture, each of the sensors and actuators in the system is directly connected to a central controller. For example, in a conveyor system, the motor controllers that control the conveyors, along with the photo eyes that sense articles being carried on the conveyor, would all have direct wire connections to the central controller. In a second type of control architecture, a central controller is directly connected to each and every actuator or sensor in the material handling system via a network or other type of system that uses shared communication channels. While this latter type of system has the advantage over the former system in that it reduces the wiring necessary to implement the system, both systems have their drawbacks. In particular, both systems require the central controller to deal with each and every actuator and sensor in the system. This may severely tax the capabilities of the central controller, requiring it to prioritize messages and delay certain responses. Additionally, such systems may be difficult to scale to different sizes when implemented. For example, a central controller that can accommodate 10 inputs and outputs may not be capable of accommodating 100 or even 1000 inputs and outputs without redesigning the entire central controller. Past systems that have used shared communication channels have also required high bandwidths in order to accommodate all the necessary communication.

Accordingly, the desirability of a material handling control system that overcomes these and other disadvantages can be seen.

SUMMARY OF THE INVENTION

The present invention substantially overcomes the above-noted disadvantages and provides a material handling control system architecture that is highly modularized, scalable, and easier to implement and repair than prior systems.

According to one aspect of the present invention, a control system for controlling one or more conveyors having at least one sensor for sensing information about the conveyors, and at least one actuator for controlling one or more aspects of the conveyors is provided. The control system includes at least one low-level controller that receives signals from the sensor and outputs commands to the actuator. A mid-level controller is also provided that receives status information from the low-level controller and outputs commands to the low-level controller. A high level controller is also provided which receives status information from the mid-level controller and outputs commands back to the mid-level controller. The commands are at least partially based on the status information.

According to another aspect of the invention, a conveyor sortation system is provided that includes at least one sensor, a sortation bed, a plurality of pushers, at least one diverter switch, and a first and a second controller. The sortation bed includes a plurality of generally parallel slats that define a conveying surface that carries articles to be sorted. The slats move in a direction of conveyance. The pushers are movably coupled to the slats in a direction generally transverse to the direction of conveyance. The first controller is in communication with the sensor and the divert switch and is adapted to issue a command to the divert switch and to determine if the divert switch successfully carried out the command. The second controller is in communication with the first controller and receives a message from the first controller if the command is not successfully carried out.

According to another aspect of the invention, a method of controlling a conveyor sortation system is provided that includes providing a sortation bed, a first controller, a second controller, and a plurality of third controllers. The sortation bed includes a conveying surface movable in a direction of conveyance. The first controller is adapted to determine an article's intended destination. The second controller is adapted to determine an article's position on the conveying surface. The third controllers control a plurality of associated divert switches that are used for selectively diverting articles off of the sortation bed. An article's intended destination is sent from the first controller to the second controller and one of the plurality of third controllers is selected based on the article's intended destination. Thereafter, an article's location on the conveying surface is sent from the second controller to the selected third controller and the selected third controller is instructed to divert the article when the location reaches the associated divert switch.

According to yet another aspect of the present invention, a conveyor sortation system is provided that includes a sortation bed having a plurality of generally parallel slats that define a conveying surface that carries articles to be sorted. The slats are movable in a direction of conveyance. The system further includes a detectable element, a plurality of pushers and switches, a sensor, and a switch controller. The detectable element is coupled to at least one of the slats that identifies the slat. The pushers are movably coupled to the slats and movable along the slats in a direction generally transverse to the direction of conveyance. The switches are capable of selectively assuming a diverting state in which the switches cause at least one of the pushers to move in the generally transverse direction. The sensor detects the detectable element and the switch controller activates one or more of the switches into the diverting state based at least partially on when the sensor detects the detectable element.

The present invention focuses each level of the system at progressively higher levels of abstraction in the material handling control scheme. Progressing from a pure sensor and actuator focus, up to individual packets of material being moved and finally to overall streams of material in the system. This provides for greater isolation of conflicting functionality such as user interface and hard real-time control, thus making the design of each level simpler and easier to both develop and incorporate new technologies as they become available. The present invention may advantageously be applied to conveyor material handling systems, including conveyor sortation systems.

As noted above, the present invention provides improvements in material handling control systems, such as scalability, cost, repair, and simplicity. These and other benefits, results, and objects of the present invention will be

BRIEF DESCRIPTION OF THE DRAWINGS

FIG. 5 is a perspective view of a shoe and slat that may be used with the conveyor of FIG. 4;

FIG. 6 is a side, elevational view of the diverter shoe of FIG. 5;

DESCRIPTION OF THE PREFERRED EMBODIMENTS

Figure 1:
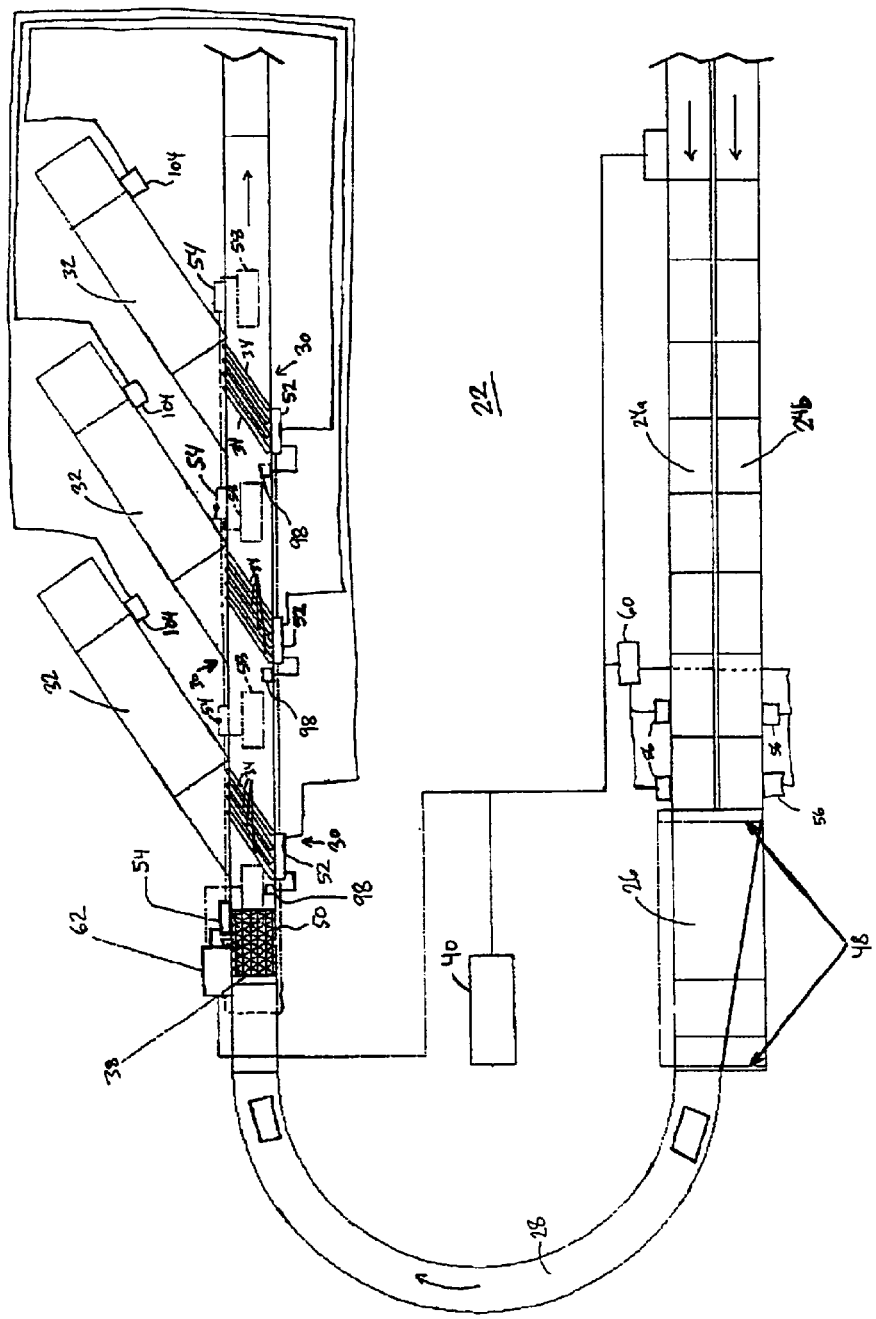
FIG. 1 is a plan view of a conveyor control system according to one aspect of the present invention.
Figure 2:
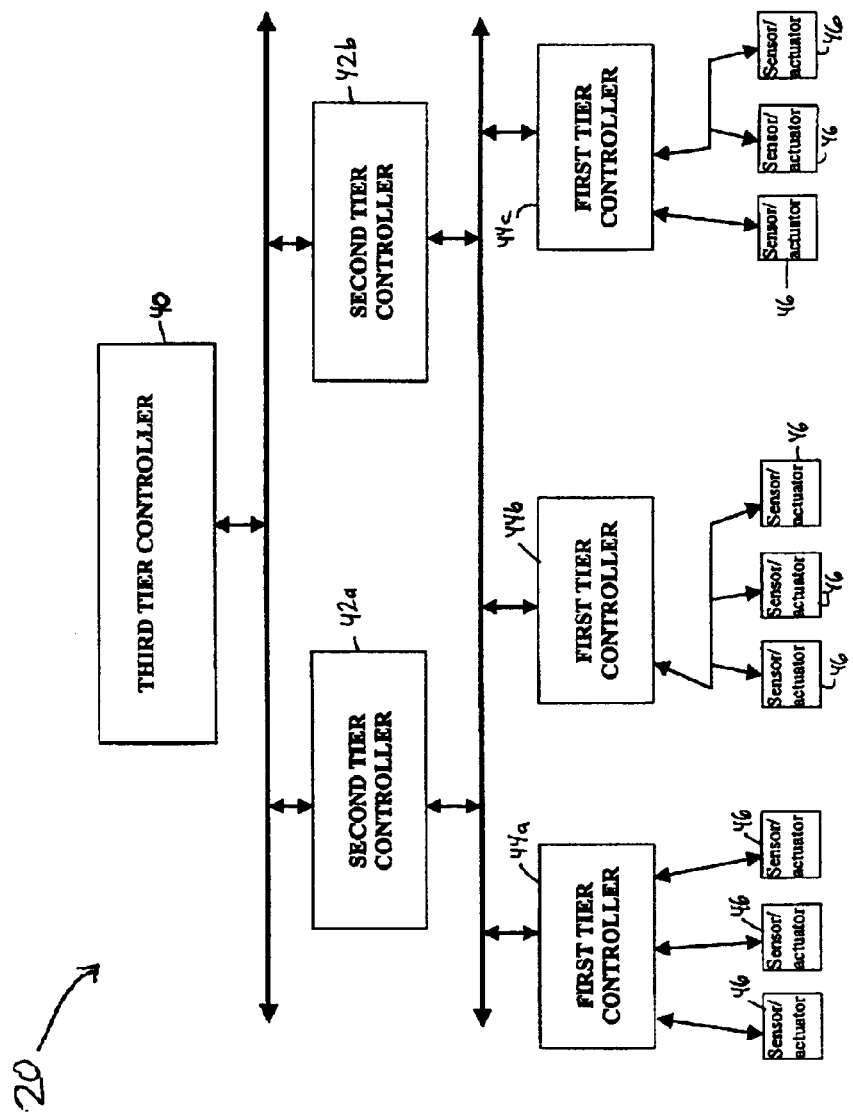
FIG. 2 is a block diagram illustrating the control architecture according to one aspect of the present invention.

The present invention will now be described with reference to the accompanying drawings wherein like reference numerals correspond to like elements in the several drawings. An illustrative example of a tiered control system 20 according to one aspect of the present invention is depicted in FIGS. 1 and 2. Control system 20 is depicted for use in conjunction with a conveyor system 22. While tiered control system 20 can be used for controlling material handling systems other than conveyor systems, a conveyor system will be used herein for purposes of description and it should be understood that, unless otherwise specified, the term conveyor is intended to cover all such systems. For example, it will be understood that tiered control system 20 could be used to control other conveyor systems including electrified monorails, automatic storage and retrieval systems, automated guided vehicles, combinations thereof, and other sorts of material handling operations in addition to conveyor systems. Although the invention is illustrated with a conveyor system having a type of linear sorter, namely a positive displacement shoe and slat sorter, it could be used with conveyor systems having other types of linear sorters or non-linear sorters. Examples of non-linear sorters include carousel sorters, such as cross-belt, tilt tray sorters and the like. It will also be understood that while the preferred embodiment depicts the tiers residing in physically separate modules in conveyor system 22, this physical separation is not a necessary aspect of the present invention.

Figure 4:
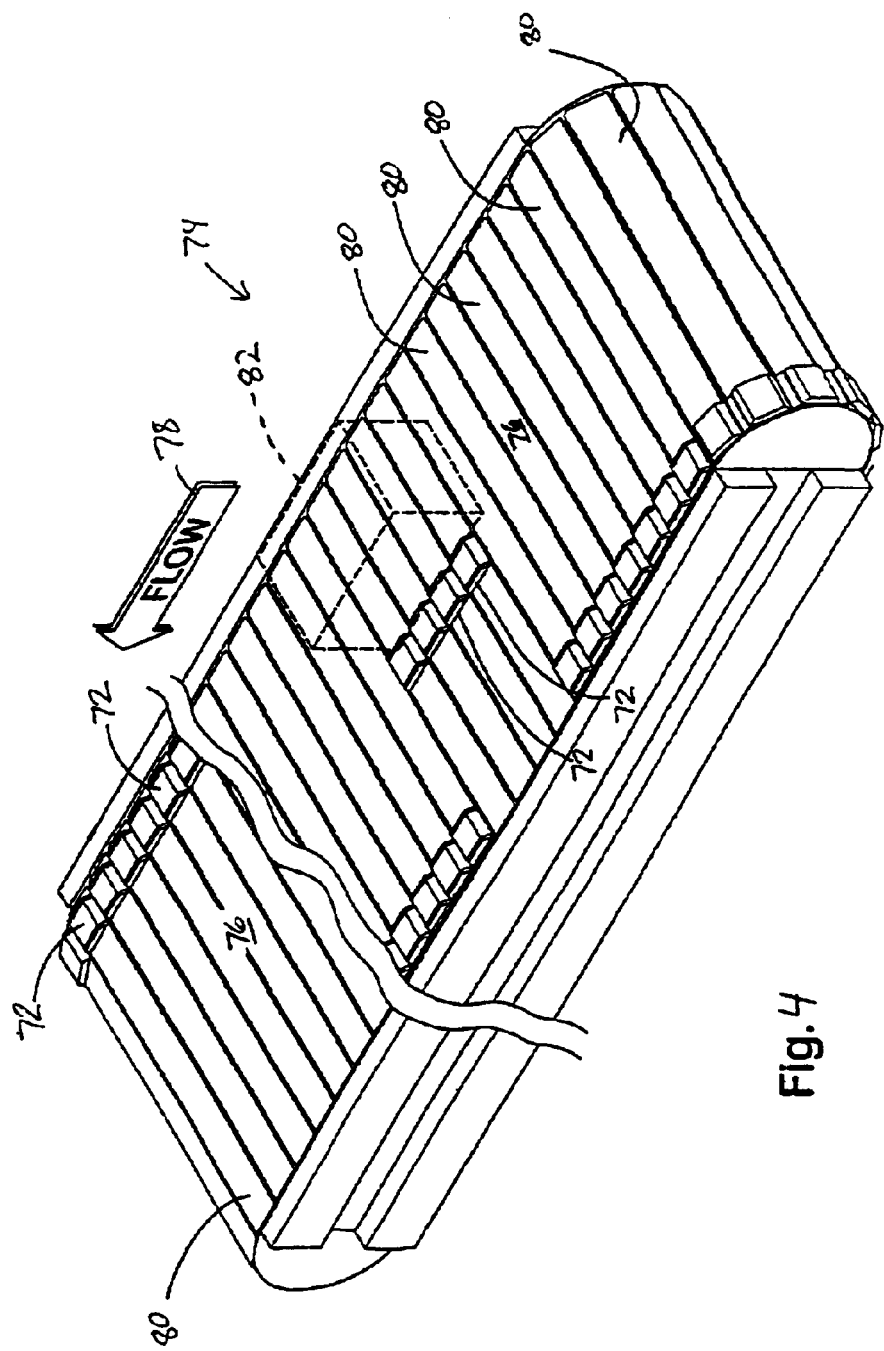
FIG. 4 is a perspective view of a sortation conveyor bed which may be used in conjunction with the present invention.

Conveyor system 22 includes an induction subsystem including one or more induct conveyors. Illustrated are a first induct conveyor 24a and second induct conveyor 24b which carry packages or other articles on their top surface in the direction indicated by the arrow (FIG. 1). Induct conveyors 24a and b feed into a merge conveyor 26 which merges the articles on induct conveyors 24a and b into a single conveyor 28. However, a single line induct of the type disclosed in commonly assign U.S. patent application Ser. No. 09/669,170 filed Sep. 25, 2000 by Affaticati et al. for a HIGH RATE INDUCTION SYSTEM, the disclosure of which is hereby incorporated herein by reference may be used. The control of the induction and gapping of articles may use the techniques disclosed in commonly assigned U.S. patent application Ser. No. 09/851,021, filed May 8, 2001 entitled CONVEYOR INDUCT SYSTEM, the disclosure of which is incorporated herein by reference. Single conveyor 28 carries the articles to a number or sortation stations 30 which selectively sort the articles onto a plurality of branch conveyors 32. The precise mechanism for sorting articles onto branch conveyors 32 can vary substantially within the scope of the present invention. The sortation equipment described herein is for illustration purposes and utilizes a plurality of shoes or pushers that move transversely across conveyor 28 in sortation stations 30 (See FIG. 4.). These shoes may be of the kind disclosed in commonly assigned U.S. Pat. No. 5,127,510 issued to Cotter et al. or commonly assigned U.S. patent application Ser. No. 09/968,743 filed Sep. 28, 2001, both of the disclosures of which are hereby incorporated herein by reference. Alternatively, the shoes may be of the type depicted herein in FIGS. 4 and 5. Still other types of shoes can be used within the scope of the invention, as well as other types of diverting structures. In the embodiment of FIG. 1, each sortation system 30 includes four guide tracks 34 which are positioned underneath the conveying surface of conveyor 28. As described more below, guide tracks 34 cause the shoes on conveyor 28 to slide transversely across the conveying surface when a divert actuator is actuated for a respective guide track 34. Conveyor 28 may further include a scanning station 38 located upstream of sortation stations 30. Scanning station 38 may comprise one or more photo eyes, cameras, or other devices for automatically determining the intended destination for packages, or other articles, that are being conveyed by conveyor 28. Scanning station 38 may also be configured to measure the dimensions and/or orientation of articles that are being conveyed on conveyor 28.

Packages or articles entering conveyor system 22 thus enter the system illustrated in FIG. 1 on either induct conveyor 24a or 24b. Induct conveyors 24a and b may be controlled in order to provide proper gapping between packages as they are merged together on merge conveyor 26. After being merged, the packages or articles travel on conveyor 28 through scanning station 38. Scanning station 38 may read the barcodes or other means which are affixed to each of the articles to determine the proper sorting of each of the articles. Alternatively, the intended destination of articles may be determined in a location upstream of scanning station 38 and scanning station 38 may simply determine an article's precise location on the conveying surface of sortation system 30. In addition to the article's precise location, scanning station 38 may also measure the article's length and/or width. A plurality of branch conveyors 32 follow scanning station 38. Based on the intended destination of a particular article, it is diverted at the appropriate sortation station 30 onto the appropriate branch conveyor 32. Tiered control system 20 controls all of the operations necessary for moving the articles from induct conveyors 24 to sortation conveyors 32. Tiered control system 20 is depicted schematically in FIG. 2 and described further below.

Tiered control system 20, in the illustrated embodiment, includes three tiers of controllers. It will be understood that the present invention finds equal applicability to tiered control systems that include two or more tiers of controls. As illustrated in FIG. 2, tiered control system 20 includes one or more first tier controllers 44*a, b,* and *c,* one or more second tier controllers 42*a* and *b,* and one or more third tier controllers 40. Each first tier controller 44 is in communication with one or more sensors or actuators 46 that are used in conveyor system 22. The sensors or actuators 46 may include photo eyes for detecting the presence or absence of articles traveling on conveyor system 22, speed or rotation sensors for detecting the speed of conveyor motors, cameras for determining information about the articles traveling on conveyor system 22, bar code readers for scanning barcodes affixed to the traveling articles, Hall effect sensors for detecting changes in magnetic flux, or any other types of sensors which may be employed in a conveyor system. Sensors/actuators 46 may also include motors, divert switches for diverting shoes, and any other type of actuator which may be used in a conveyor system. In the embodiment depicted in FIG. 1, sensors/actuators 46 would include photo eyes 48 and 104, slat sensors 50 and 98, and a plurality of motors for powering each of the individual conveyors in conveyor system 22 (not shown). The sensors/actuators 46 are in communication with one of the first tier controllers 44*a*–*c*. The communication may be by any known communication protocol and may include direct links between each sensor/actuator 46 and the first tier controller 44 such as is illustrated with controller 44*a* (FIG. 2). Alternatively, the first tier controller 44 may have a single communications input and output which branches to each of the connected sensors/actuators 46 such as is illustrated for first tier controller 44*b*. As yet another variation, first tier controller 44 may include a mix of direct links to sensors/actuators 46 and branching links, such as is illustrated with respect to first tier controller 44*c*. In the embodiment depicted in FIG. 2, each first tier controller 44 is in communication with three sensors/actuators 46. It will, of course, be understood that the number of sensors/actuators 46 with which each first tier controller is in communication can be varied as desired. Also, the number of first tier controllers 44 can be varied from that depicted in FIG. 2, as well as the number of second tier controllers 42.

A slat sensor 50 is positioned upstream of the branch conveyors 32. Slat sensor 50 is preferably a device incorporating both an inductive proximity sensor that detects the aluminum slats that define the sortation conveying surface and a Hall effect sensor to detect embedded magnetic fields in the slats to allow flexible differentiation of slats, as will be described more below. This allows a single sensor to provide for speed sensing, slat position sensing and unique slat identification. This latter feature allows the low level controllers 52 to simply react to a particular slat by appropriate actuation of switches to initiate a divert without the need for precise timing information from the tier two controller 64 which is managing the sortation of individual packages. An example of slat sensor 50 is disclosed in published International Patent Application No. 02/26602A2 published Apr. 4, 2002, the disclosure of which is hereby incorporated herein by reference.

In this way, each first tier controller 44 can be primarily responsible for the detailed communications and controls for each of the connected sensors/actuators 46. Each first tier controller may comprise a processor circuit board, such as a simple 8-bit microprocessor board, although other variations are possible. Each first tier controller may be custom designed to perform a very specific set of tasks and they may have little or no human/machine interface. Examples of first tier controllers 44 depicted in FIG. 1 include divert control modules 52, motor control modules 54, and gapping control modules 56. Divert control module 52 is responsible for selectively diverting the shoes that move transversely across the conveying surface in sortation stations 30. Divert control module 52 communicates with actuators 46 which, in this case, are switches. The switches may be of a mechanical or electromagnetic type, or some combination thereof. An example of actuator 46 is disclosed in published International Patent Application No. 01/83342A1 published Nov. 8, 2001, the disclosure of which is hereby incorporated herein by reference. If the diverting of articles onto branch conveyors 32 is to be carried out by means other than transversely moving shoes, divert control module 52 would be in communication with the actuators used for carrying out this type of divert.

Motor control modules 54 control a plurality of motors 58, which may be linear induction motors, or conventional rotating motors, and which are used to power the conveying surface of the conveyor. The linear induction motors 58 therefore may power slats, bars, or other means for carrying articles. A gapping control module 56 controls one or more of the motors that power the various belts of one or more sections of induct conveyors 24*a* and *b*. Each gapping control module 56 controls the speed and acceleration of induct conveyors 24*a* and *b* in order to assign proper gapping distances between each of the articles traveling on the conveyor according to the speed schedule determined by the gap manager 60. In the illustrated embodiment, gapping control module 56 does not determine or sense the desired gaps between the articles, that information is provided from a second tier controller, such as gap manager 60. Gap manager 60 supplies actuator/servo sequences, such as ones that are generated in response to inputs from photoeyes, encoders or other sensors.

Each of the first tier controllers 44 communicates with one or more second tier controllers 42. The communication may be accomplished by any known means, such as peer to peer field bus communications. Examples of bus systems that can be used include CAN bus, ASI bus, profibus, Bluetooth, and others. The communication may include either status information or commands between the first tier and second tier controllers. By using field bus communications, the processors in the first tier and second tier controllers are not required to direct the communication between the two systems. The communications take place using defined types of messages, each having a pre-defined format. By using only defined messages with pre-defined formats, the specific types of first and second tier controllers in any given system can easily be replaced or upgraded without having to replace all of the other higher or lower tier controllers. The first tier controllers generally operate substantially in real time. For example, they may sense changes in their inputs at high rates, such as within ten milliseconds or less, although other rates can be used within the present invention.

Second tier controllers 42 may include such controllers as gap managers 60 and divert manager 62. These second tier controllers may use a higher level, commercial off-the-shelf processor board such as an X-86 class board. Other types of processor boards are, of course, possible. The second tier controllers are designed to do soft, real time processing or embedded processing. The second tier controllers know about the task of the specific subsystem (e.g., first tier controller or controllers) and use the subsystem capabilities to execute tasks assigned to the second tier controllers by the third tier controller. The second tier controllers 42 have limited, if any, human/machine interface.

Second tier controllers 42 are aware of individual cartons and their position, and issue appropriate commands to their respective first tier controllers. The first tier controllers, on the other hand, do not maintain information on the position of the cartons or other types of articles, but rather follow the instructions received from the second tier controller. For example, divert manager 62 maintains information on carton position, which diverts are associated with which groups of branch conveyors 32, which sortation stations 30 may have less than all their diverting shoes operable and the like. On the other hand, divert manager 62 would not issue commands directly to motors to control the sortation bed speed or to switches to divert articles. Instead, second tier controller 42 issues higher level commands to tier one controllers, such as the amount of propulsion that should be exerted to propel the sortation bed, or the specific slats that should have their associated pushers diverted. The tier one controllers interpret these commands and issue appropriate control signals that power the attached motors or switches in a manner that will effect the higher level command from the tier two controller. The tier one controllers thus include intelligence about the specific signals that are needed to control their attached actuators, as well as sufficient intelligence to convert the high level tier two commands into the appropriate control signals to be output to the actuators.

Third tier controllers 40 are the highest level controllers in tiered control system 20. Third tier controllers 40 are dedicated to plant interface and system wide control and decision making. At this level, details of how cartons are sorted, inducted, identified and the like are not directly controllable. Third tier controller 40 is concerned with the carton flow and routing, plant interface, central diagnostics, and fault reporting, system start up/shut down control and the like. Third tier controllers 40 are not necessarily real time or soft real time processors.

Third tier controller 40 may use conventional, off-the-shelf micro computer hardware at the Pentium® class level. Other types of hardware may, of course, be used. Third tier controller 40 has significant communications and human/machine interface capabilities. It may also be a node on a plant wide network or on a global network, such as the Internet. Third tier controller 40 generally does not concern itself with cartons as individual entities but rather controls streams of cartons and information flow broadly.

It will of course be understood by those skilled in the art that tiered control system 20 has applications to systems other than that depicted FIG. 1. For example, FIG. 1 depicts multiple first and second tier controllers. It would also be possible to implement tiered control system 20 for a single portion of a conveyor system 22. For example, tiered control system 20 could be implemented primarily for the diverting aspects of a conveyor system. An example of such a system is described below.

Figure 3:
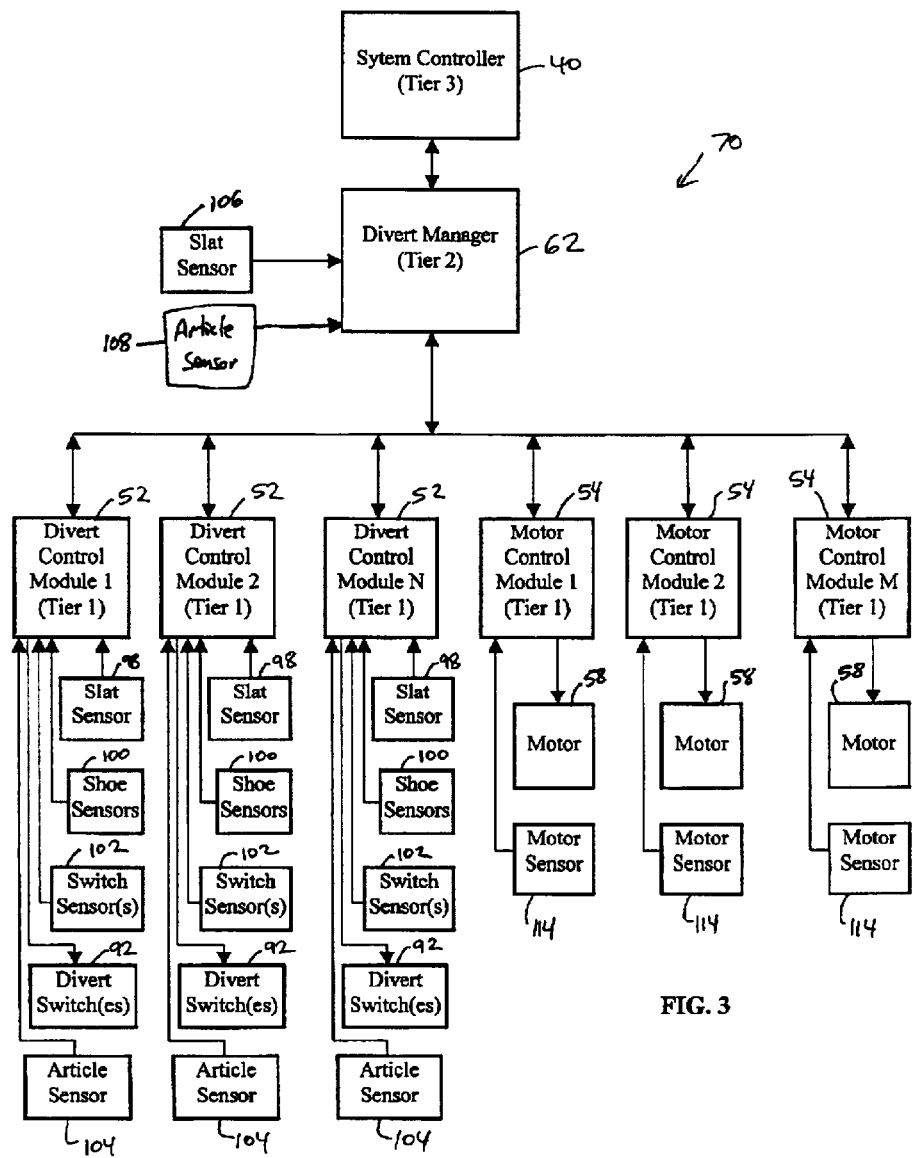
FIG. 3 is a block diagram illustrating one embodiment of a control system of the present invention.

A control system 70 specifically tailored to a conveyor sortation system is depicted in FIG. 3. Control system 70 is but one specific application of a tiered control system 20. Control system 70 is used to control a conveyor sortation system, such as one comprised of the various parts and components depicted in FIGS. 4–9. Control system 70 is a three tiered control system. It includes a tier three system controller 40; a divert manager 62, which is a tier two controller; and a plurality of tier one controllers. In this particular embodiment of control system 70, the tier one controllers come in two different types: divert control modules 52 and motor control modules 54. Divert control modules 52 control the diverting movement of a plurality of shoes or pushers 72 on a sortation bed 74 in a manner which will be described in more detail below. (See FIG. 4). Motor control modules 54 control the speed of the sortation bed 74. With specific reference to FIG. 4, motor control modules 54 control the speed at which a conveying surface 76 moves in the direction indicated by arrow 78. The operation of controllers 40, 52, 54, and 62 will now be described with reference to the conveyor sortation system and its components depicted in FIGS. 4–9.

Figure 7:
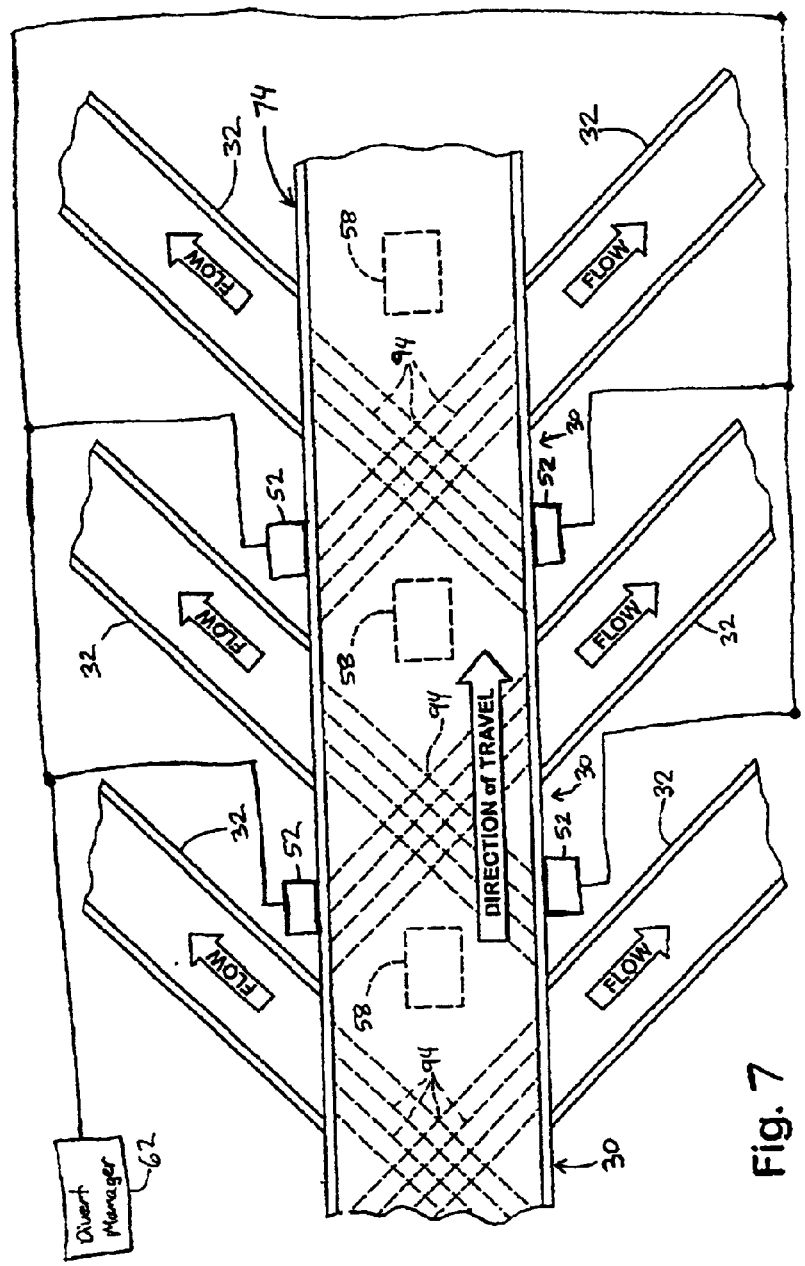
FIG. 7 is a plan schematic view of the sortation bed of FIG. 4 illustrating several branch conveyors and control structures.

The construction and operation of sortation bed 74 is described more fully in commonly assigned, U.S. Provisional Patent Application Ser. Nos. 60/236,230 and 60/278,892, filed on Sep. 28, 2000 and Mar. 26, 2001, respectively. The construction and operation of sortation bed 74 is also described more fully in International Publication No. WO 02/26602 A2. The entire disclosure of all three of these applications is hereby incorporated herein by reference. It should be understood that sortation bed 74 is but one example of an environment in which control system 70 can be applied, and is set forth in detail herein to more fully understand the application of control system 70. In general, sortation bed 74 includes a plurality of slats 80 which are interconnected with each other to form an endless loop, the top surface of which defines conveying surface 76. Slats 80 are powered by linear motors that cause them to move in the direction indicated by arrow 78. Articles 82, such as packages or other items to be conveyed, are carried on the conveying surface 76. A plurality of branch conveyors 32 are positioned along either side of sortation bed 74, such as depicted in FIG. 7. When conveying surface 76 has moved an article 82 to a position generally adjacent a branch conveyor 32 that leads to the article's intended destination, the article is automatically pushed off of sortation bed 74 onto the correct branch conveyor 32.

Figure 8:
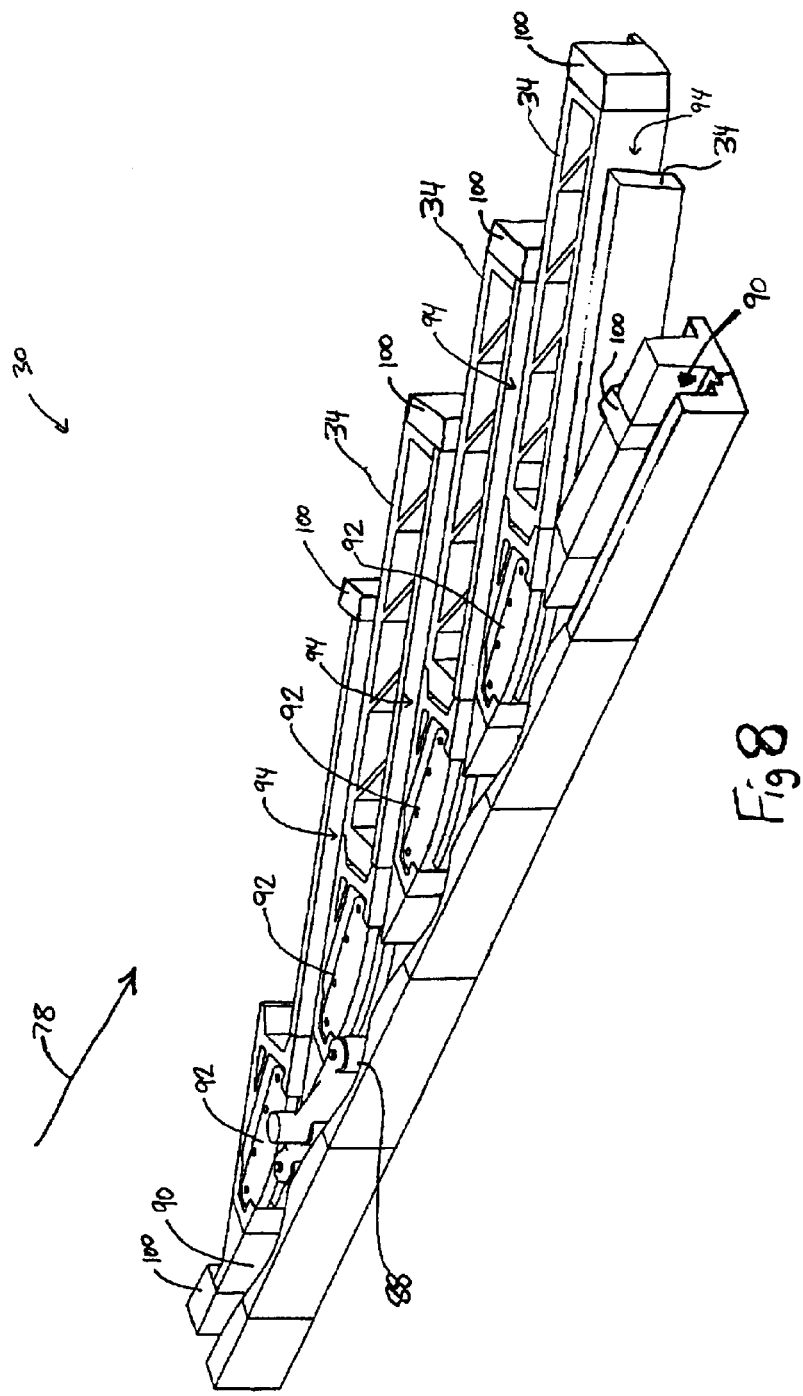
FIG. 8 is a perspective view of a divert mechanism usable with the sortation bed of FIG. 4.

The articles are pushed off of sortation bed 74 by way of the pushers 72. Each pusher 72 is movable along the length of its associated slat 80 in a direction perpendicular to the direction of movement 78 of conveying surface 76. This direction of movement is indicated by arrow 84 in FIG. 5. Each pusher 72 includes a downwardly depending pin 86 to which is attached a transfer assembly 88. Transfer assembly 88 is an elongated member utilized to divert the pusher 72 along a particular guide rail or track 34 which thereby causes the pusher to move generally transversely across conveying surface 76. A transfer assembly 88 is depicted in FIG. 8 without its attached pusher for purposes of clarity. When a pusher 72 is not being used to push an article off of conveying surface 76, transfer assembly 88 travels in a channel 90 defined along one side of conveying surface 76. Channel 90 is oriented generally parallel to the direction of conveyance 78. A pusher 72 whose transfer assembly 88 is traveling in channel 90 therefore stays along one side of its associated slat and does not divert any articles off of sortation bed 74.

When an article is to be diverted to a particular branch conveyor 32, guide tracks 34 and switches 92 are used. In the illustrated embodiment, there are four guide tracks 34 positioned adjacent each branch conveyor 32. It will be understood that the present invention finds application to systems with only a single guide track adjacent each branch conveyor, or to systems with still other numbers of guide tracks 32. When a pusher 72 is to be diverted to move longitudinally along the length of its slat 80 (i.e. transversely to the direction of conveyance 78), a selected switch 72 is activated. In the illustrated embodiment, switches 72 are electromagnetic switches and transfer assemblies 88 include magnetic portions that are attracted to electromagnetic switches 72 when energized. This attraction diverts the transfer assembly 88 out of channel 90 into a divert path 94 adjacent the energized electromagnetic switch 92. The divert path 94 is defined adjacent a divert rail or guide track 34 associated with that particular electromagnetic switch 92. Because the guide tracks 34 are angled with respect to the direction of conveyance 78, the transfer assembly 88 is pushed in a direction having a motion component that is transverse to the conveyance direction 78. This movement causes the pusher 72 to move along its associated slat and thereby push against an article that is on the slat. By selecting particular ones of switches 92 to activate, as well as particular lengths of times for them to be activated, different numbers of shoes 72 can be diverted to cause an article to be pushed off of sortation bed 74 in different manners. Divert tracks 34 may be configured, and switches 92 may be activated, in the manners described in commonly assigned U.S. Pat. No. 6,041,909, issued Mar. 28, 2000 to James Shearer, Jr., the disclosure of which is hereby incorporated herein by reference.

Figure 9:
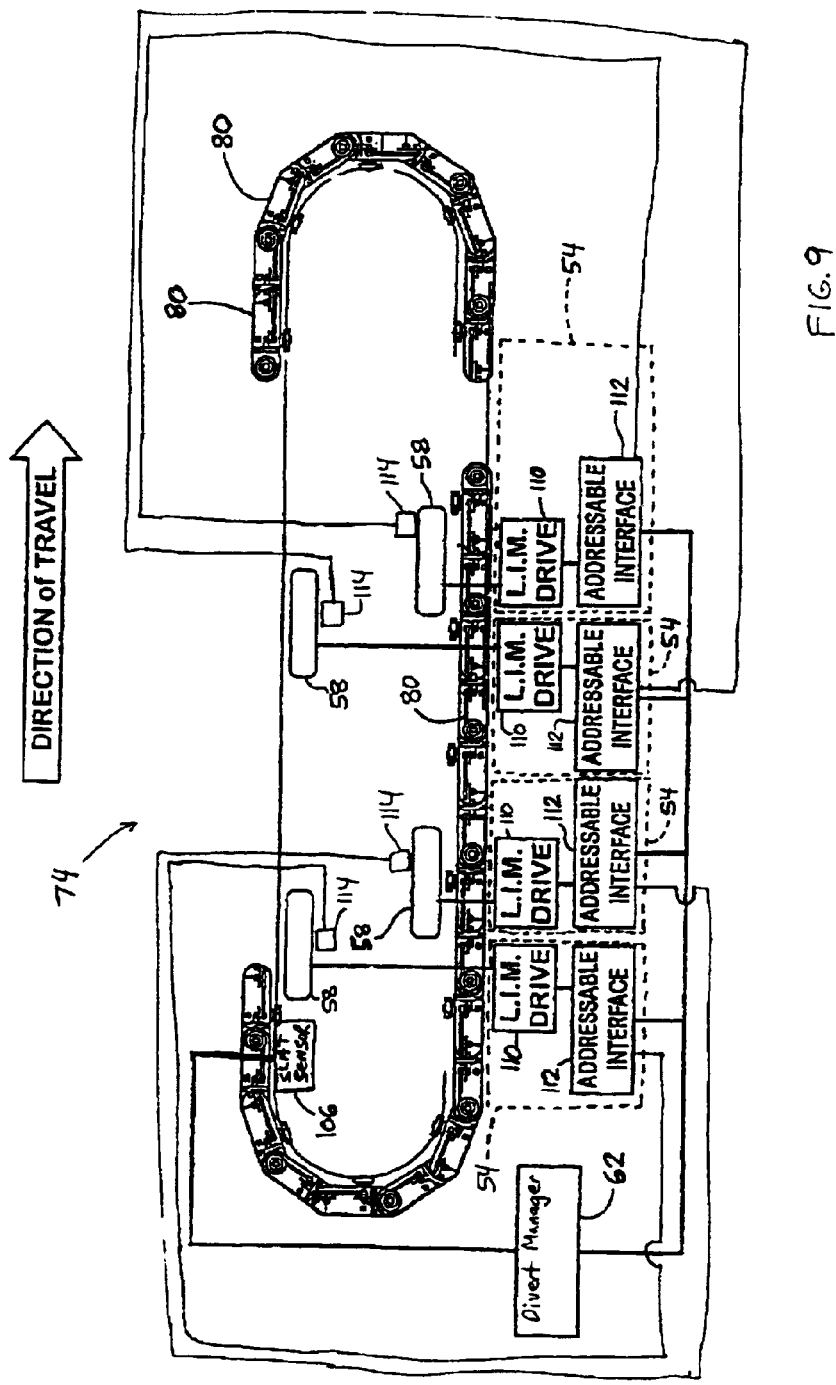
FIG. 9 is a schematic view of the sortation bed of FIG. 4 illustrated with a speed control system.

At least one slat 80 includes a unique identifier, such as a magnetic plate 96 positioned generally near the bottom of the slat (FIG. 6). The slat with such an identifier defines an index slat 80*a*. The magnetic plate 96 is detectable by slat sensors 98 positioned underneath slats 80. In addition to sensing when the index slat 80*a* passes over them, slat sensors 98 are also designed to detect the spaces or air gaps between each slat 80 as they pass over the slat sensor 98. As illustrated in FIG. 9, each slat sensor 98 is connected to an associated divert control module 52. Each slat sensor 98 sends a signals to its associated divert control module 52 when it detects the index slat 80*a* above it, as well as when it detects each gap between each slat 80. Each divert control module 52 is provided information on the total number of slats 80 that make up sortation bed 74. Each divert module 52 uses this information in combination with the signals from slat sensor 98 to determine which particular slat is above its associated slat sensor 98 at any given time. Divert control module 52 does this by detecting the index slat 80*a* and then counting the number of slats that subsequently pass by slat sensor 98. For example, index slat 80*a* may be assigned a unique number, such as the number one. The next slat that passes by is assigned another unique identifier, such as the number two. Each subsequent slat may be assigned the next integer number until the index slat 80*a* is once again detected. Divert control module 52 counts how many slats have passed over slat sensor 98 by counting the number of signals it receives from slat sensor 98, which sends a signal each time the gap between two adjacent slats is detected. By counting the number of slats that pass by each slat sensor 98, divert control module 52 knows what particular slat is above that sensor 98 at any given time. This information is used to determine at what moment in time the electromagnetic diverter switch or switches 92 that are controlled by divert control module 52 should be activated, as will be explained in more detail below.

As noted above, slat sensors 98 may include a conventional Hall effect sensor for detecting when magnetic plate 96 passes by it. In order to detect the gaps between slats 80, slat sensor 98 may also include a reluctance sensor that detects when a metallic material comes into close proximity to a detection head surface on the sensor. Because the slats 80 are preferably made of metal, such as aluminum, the reluctance sensor detects the gaps between slats by detecting those instances when no adjacent metal (i.e. no slat) is present. The design of the reluctance sensor can vary within the scope of the invention, and other types of sensors can be used. Details of one type of reluctance sensor that can be used with the present invention are found in the published PCT patent application assigned international publication number WO 02/26602 A2, which, as noted above, has been incorporated herein.

In addition to slat sensors 98, each divert control module 52 is connected to, and in communication with, at least one shoe sensor 100, at least one switch sensor 102, at least one divert switch 92, and at least one article sensor 104. In the specific embodiment of FIGS. 3–9, each divert control module 52 is connected to, and in communication with, six shoe sensors 100, one switch sensor 102, four divert switches 92, and one article sensor 104. These numbers can be varied. Furthermore, the use of sensors 100, 102, and 104 is optional, and any one or more of these types of sensors can be omitted from control system 70. Divert control module 52 implements the specific communications protocol that is used with each of these sensor and actuators; the specific voltages, currents, and/or frequencies that must be applied to drive a particular actuator; and the meaning of the electrical signals that it receives from the associated sensors. This information is not passed on in its entirety to the second tier controllers 42. Therefore, if changes in sensors or actuators 46 are made, only the associated divert control module 52 may need to be modified. This allows improvements in individual sensors and/or actuators to be easily implemented in a sortation system without having to change large portions of the control system. In addition to the communication information discussed above, divert control modules 52 also include algorithms on how to react to various situations that may occur without having to seek instructions from a tier two controller 42. This awareness and the particular types of situations this knowledge may be used in is described in more detail below, but generally includes such things as the malfunction of one or more switches 92, the improper or failed diverting of a pusher 72, and other situations.

Shoe sensors 100 are an optional component of tiered control system 70. Shoe sensors 100 may be positioned in the six locations illustrated in FIG. 8. Shoe sensors 100 may be any type of sensor capable of detecting the passage of a shoe by the sensor. In one embodiment, shoe sensors 100 may be Hall effect sensors that detect the transfer assembly 88 of a shoe or pusher 72 as it passes by in either channel 90 or one of the divert paths 94. One shoe sensor 100 is preferably positioned upstream of the set of divert switches 92 that is under the control of the same divert control module 52 that the shoe sensor 100 is in communication with. In other words, one shoe sensor 100 is positioned at the upstream end of a sortation station 30. Another shoe sensor 100 is preferably positioned at the downstream end of the same sortation station 30. The remaining four shoe sensors 100 are positioned along divert paths 94 in any suitable location that is downstream of switches 92. With this arrangement, a transfer assembly 88 about to enter sortation station 30 will first be detected by the upstream shoe in path 90. Thereafter, that transfer assembly will be detected by one of the other five shoe sensors 100 before it exits sortation station 30. If no such exiting of the transfer assembly 88 is detected by any of these five shoe sensors 100, then it can conclude that a malfunction has occurred. Either one of the shoe sensors 100 has failed to detect the transfer assembly 88, or the transfer assembly 88 has broken away from the rest of the pusher 72 and fallen beneath paths 90 or 94.

Divert control module 52 keeps track of the detection of a transfer assembly 88 by the upstream-most shoe sensor 100 in a sortation station 30. After the transfer assembly 88 has been detected, divert control module 52 not only checks to see that the transfer assembly 88 subsequently exits the sortation station by passing by one of the other five shoes sensors 100, but it also checks to see that the transfer assembly 88 has passed by the correct shoe sensor 100. For example, if the transfer assembly 88 was attached to a shoe 72 that was supposed to be diverted down the upstream-most divert path 94, then the shoe sensor 100 in the upstream-most divert path 94 should detect this transfer assembly when it passes by. If it does not detect this transfer assembly, but one of the other shoe sensors does, then divert control module 52 knows that the shoe followed an incorrect path. Moreover, by knowing which shoe sensor 100 detects the mis-diverted transfer assembly, divert control module 52 will know which particular divert path 94 or straight path 90 the mis-directed shoe actually traveled down. Based on the information detected by shoes sensors 100, divert control module 52 takes appropriate action.

The appropriate action will depend upon the particular divert error detected by shoe sensors 100. If a shoe is detected entering sortation station 30, but no shoe is detected exiting the station, then the shoe and transfer assembly may very well have been broken. In such a case, divert control module 52 would inform divert manager 62 (a tier 2 controller) of the failure. Divert manager 62 may rank this error as a serious error and initiate a shut down sequence for the sortation bed 74. Divert manager 62 would inform a system controller—a tier 3 controller—of its shut down procedure. Either the tier 3 controller or the divert manager 62 would inform any controllers upstream of sortation bed 74 that needed to know about the sortation bed's shut down so that they could take appropriate action, such as shutting down so that articles do not keep getting fed to a non-operating sortation bed 74. Alternatively, the divert manager may instead record the shoe failure and remove that shoe from the list of shoes available for diverting.

If a divert control module 52 detects that a transfer assembly 88 has merely been mis-directed down one of divert paths 94 or straight path 90, rather than having broken up and disappeared from detection, then the divert control module 52 may note this error and send a message to divert manager 62 of the error. Because such an error may not be as serious as a broken shoe and transfer assembly, divert control module 52 may continue to divert shoes 72 and the sortation bed 74 may not be shut-down immediately. Divert manager 62 would log the noted error and keep track of all such errors. Divert manager 62 is programmed to send a status message to the tier three controller about the noted error so that it can be communicated to humans via an interface controlled by the tier three controller. Divert manager 62 may also preferably be programmed to only initiate a shut-down of the sortation bed 74 if the number of mis-directed shoes over a given time period of a particular switch 92 exceeds a predetermined threshold. The shut down sequence could also be influenced by information received from article sensor 104, as described below.

At least one article sensor 104 may be positioned along each branch conveyor 32 (FIG. 1). Each article sensor 104 may be a conventional photo-eye or other type of conventional sensor that detects the presence of an article as it travels by the sensor on the branch conveyor 32. Each article sensor 104 is in communication with the divert control module 52 that controls the diverting of articles onto the particular branch conveyor 32 on which sensor 104 is positioned. Thus, each article sensor 104 sends signals to its associated divert control module 52 indicating when an article on branch conveyor 32 is detected. This allows divert control module 52 to determine whether an article has been successfully diverted to a branch conveyor 32.

For example, if the divert control module 52 activates one or more switches 92 to a diverting state and the corresponding article sensor 104 does not subsequently detect the passage of an article on the branch conveyor, then the article was not successfully diverted. The article may still be on sortation bed 74, or it may have fallen onto the floor. When divert control module 52 detects this error, it sends a status message of the error to divert manager 62. Divert manager 62 may be programmed to log the error and pass a message onto the tier three controller to output notification to the human interface controlled by the tier three controller. Divert manager 62 may also be programmed to keep track of the frequency of such error messages for each individual divert module 52. If the package diversion errors occur for a particular sortation station at a particular frequency above a threshold, then divert manager 62 may initiate a shutdown of sortation bed 74. For example, if divert manager 62 detects that two or more articles that were to be diverted down a particular branch conveyor 32 are successively mis-diverted, then an article jam or pile-up may have occurred that will prevent any further articles from being diverted down that particular branch conveyor. In such a situation, divert manager 62 may be programmed to first check to see if there are any other branch conveyors that are redundant to the blocked branch conveyor before initiating a shut-down.

Redundant branch conveyors are alternative conveyor branches 32 that will lead an article to a location in the warehouse or factory which is also an acceptable destination for the article. For example, a first branch conveyor 32 may convey articles to a first loading dock, while a second branch conveyor 32 may convey articles to a second loading dock. Both the first and second loading docks, however, may load articles onto vehicles that are intended for the same ultimate geographic location, and therefore an article to be diverted down the first branch conveyor 32 could also acceptably be diverted down the second branch conveyor 32. If there are any such redundant branch conveyors, divert manager 62 stores this information and consults it in the case of a successive article mis-diverts on a given branch conveyor. In such a case, divert manager 62 changes the assigned destinations of all of the articles that were otherwise to be diverted down the malfunctioning branch conveyor such that they are diverted down one or more of the redundant branch conveyors. In addition to changing the destinations, divert manager 62 also informs the tier three controller 40 so that proper notification of the malfunction can be communicated to the human operators of the system.

Divert control manager 62 may also be programmed to change which branch conveyors 32 an article is diverted down in the case where a branch conveyor is determined to be full of accumulated packages and a redundant branch conveyor is available. Article sensors 104 also detect this situation. Whenever an article is detected by a sensor 104 for a greater amount of time than would be expected for it to move beyond sensor 104, divert manager 62 determines that that branch conveyor is at least temporarily full. Divert manager 62 then causes articles intended for the full branch conveyor to be diverted down one of the redundant conveyor branches until sensor 104 provides an indication that the previously full branch conveyor is no longer full. Thereafter, divert manager 62 reverts back to diverting articles to the previously full branch conveyor in the normal manner.

As noted above, each divert control module 52 is also in control of divert switches 92 which are preferably, although not necessarily, electromagnetic switches. In order to determine if each of these switches is operating properly, a switch sensor 102 is preferably placed adjacent, such as underneath, each electromagnetic switch 92. Switch sensors 102 may be any conventional sensor, such as a Hall effect sensor, that is able to detect the electromagnetic field created by the electromagnetic switch 92 when it is activated. Divert control module 52 therefore receives feedback from switch sensors 102 regarding the successful or unsuccessful activation of each divert switch 92. If divert control module 52 determines from a switch sensor 102 that a particular switch 92 has not been successfully energized, it informs divert manager 62. Divert manager 62 logs this error. Divert manager 62 analyzes this log of errors to determine whether the unsuccessful activation of a switch is an occasional or isolated incident, or whether the errors are generally continuous. In the former case, nothing further is done with the possible exception of sending a message to the tier three controller which may communicate this to the human interface in the form of a periodic status report, or in any other form. In the latter case, divert manager 62 concludes that the particular switch 92 is inoperative and makes adjustments to the divert commands it sends to the divert control module 52 for that sortation station 30 in order to accommodate, to the extent possible, the defective switch 92.

The diverting commands sent from divert manager 62 may take on any form, but preferably are commands to divert pushers on one or more specified slats 80. As discussed above, each individual slat 80 is assigned a unique identifier. Commands from divert manager 62 specify which slats are to have their pushers diverted. These commands also specify which of the four divert switches 92 are to be used in carrying out the article divert and the sequence in which the switches are to be activated. Each divert control module 52 has information on the distance between its associated slat sensor 98 and each of its four divert switches 92. Using this information, divert control module 52 determines when the specific slat or slats identified in the divert command are immediately above each divert switch 92. Divert control module 52 therefore knows precisely when each divert switch 92 is to be activated, and the timing of this activation is completely controlled by divert control module 52. Thus, divert manager 62's divert commands do not need to specify a particular time for activating the divert switches 92, nor do they have to be sent at the precise moment when switches are to be activated. The divert commands merely need to be sent prior to the article arriving at the particular switch or switches 92 that are to be activated in carrying out the diversion of that article. Each divert control module 52 preferably includes a memory queue for retaining a predetermined number of these commands so that multiple commands can be sent and retained. Divert control modules 52 are able to remove items from these queues based on special commands from divert manager 62. Such commands to remove or alter divert commands stored in the queue may be generated in response to divert manager 62's recognition that a particular branch conveyor 32 is blocked, or otherwise unavailable, and that an alternative branch conveyor 32 must be used.

Figure 13:
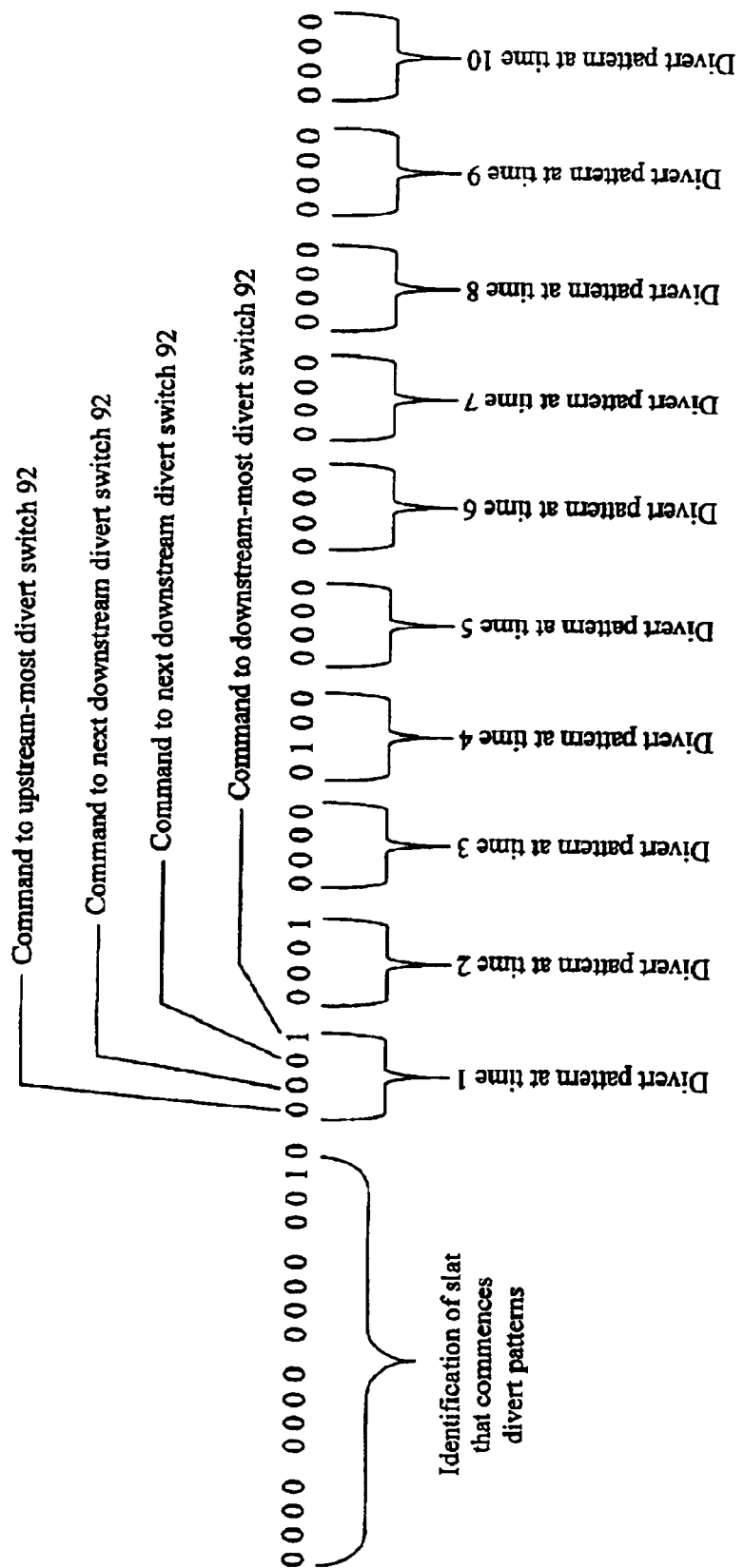
FIG. 13 is a diagram of a divert command.

The specific commands to divert pushers may identify one or more patterns of the divert switches 92 that should be activated. One example of this is illustrated in FIG. 13. A divert command is illustrated in FIG. 13 that is eight bytes long. The first two bytes identify the specific slat which will initiate the implementation of the command. In this case, the identified slat is a slat that has been assigned the identification number "2" (binary 10). The remaining digits of the command are divided into groups of four bits (nibbles) that specify patterns for activating the divert switches 92. The zeros in each nibble correspond to a non-diverting state of a switch 92 and the ones correspond to a diverting state of a switch 92. The first nibble after the pair of slat identification bytes specifies which of the four divert switches 92 should be activated at the moment the identified slat has reached the downstream switch 92 of the sortation station 30. This moment is referred to as time 1 in FIG. 13. The most significant bit of the nibble corresponds to the upstream-most divert switch 92. The second most significant bit of the nibble corresponds to the second most upstream divert switch 92. The last two bits of the nibble correspond to the respective last two divert switches 92. Thus, at the moment the identified slat is over the downstream-most switch 92 (time 1), this downstream-most switch will be activated into the diverting state, while the remaining three upstream switches will be in the non-diverting state. The next four bits of the command include a specification of which of the four switches 92 should be activated after the identified slat has moved one slat-width downstream of the downstream switch 92 in the sortation station 30 (time 2). In the illustrated command, only the downstream-most switch 92 is in a diverting state at this time. When the identified slat has moved two slat-widths downstream (time 3), none of the divert switches will be activated for this time period. In the illustrated example of FIG. 13, an additional seven switch specification nibbles are included for each moment in time that the identified slat has moved one slat width further downstream. It will be understood that the specific number of nibbles that identify divert switch activation patterns can be varied from that depicted in FIG. 13, and that the specific command depicted in FIG. 13 is only illustrative. A wide variety of different commands and divert patterns can be sent to the divert control modules 32 other than the one illustrated. It will also be understood that the different time periods illustrated in FIG. 13 are not necessarily fixed, but are dependent on the speed of the conveying surface. Moreover, the illustrated command is based on having four divert switches. If sortation stations 30 include a different number of switches 92, then the activation pattern for each moment in time will have a different number of bits. Specifically, the number of bits defining each activation pattern will be the same as the number of switches. By changing the patterns specified in the divert commands, the manner in which articles are diverted can be controlled. For example, by activating two switches 92 simultaneously that divert two pushers which impact near the front and rear ends of the article, the article will be diverted without rotation. By activating only a single switch to cause one or more pushers to be diverted, the article will be rotated when diverted. By activating different switches at different times, it is possible to divert the article with rotation during a portion of the divert and without rotation during another portion of the divert. Divert manager 62 determines the manner in which the articles are to be diverted. This decision may be based on the length of the article, its width, the absence or presence of articles immediately in front of it or behind it, the amount of physical separation between it and the trailing or leading articles, as well as the intended destination of the trailing or leading articles. Depending on the length of articles and the number of activation patterns that are sent in a given divert command, it is possible to divert more than one article using a single divert command.

Divert manager 62 generates the divert commands that it sends to the specified divert control modules 52 on the basis of the intended destination for the packages or articles traveling on the conveyor system. This knowledge of the articles' destinations may be received in a variety of different ways. The tier three controller 40 may communicate this information to divert manager 62, for example. Alternatively, divert manager 62 may be in communication with a sensor, such as a bar code scanner, that reads information directly from the articles themselves about their intended destination. Regardless of how the destination information is communicated to divert manager 62, divert manager 62 preferably is in communication with a slat sensor 106 that is upstream of all of the diverting stations 30, yet still on sortation bed 74. Divert manager 62 is also in communication with an article sensor 108 located on sortation bed 74 upstream of all the diverting stations 30 and in a known location relative to slat sensor 106. Using slat sensor 106 and article sensor 108, divert manager 62 determines which particular slats an article rests on as it travels on sortation bed 74. By knowing the identity of these particular slats, divert manager 62 formulates the appropriate divert commands. As noted above, the divert commands include the specific slats 80 whose pushers 72 are to be diverted. By knowing the intended destination for an article, as well as which branch conveyors 32 will take an article to that destination, divert manager 62 knows which of the divert control modules 52 the divert command should be sent to. Each divert control module 52 preferably includes a unique address that distinguishes it from the other divert control modules. In this manner, divert manager 62 is able to send commands to specific divert control modules 52.

The addresses of each divert control module 52 may be automatically assigned by divert manager 62 upon initial power-up of the system. Once assigned, divert manager 62 stores this information in memory so that assignment of the addresses does not need to be performed again except when a new divert control module 52 is added to the system. The automatic assignment of addresses may be carried out by an initial, global command to all divert control modules 52 in the system telling them to respond at a specified time. The time for responding may be based upon the time when index slat 80a passes by the divert control module 52. By using index slat 80a as the signal for responding to divert manager 62, the responses of each divert control module 52 will not interfere with each other. For every response, divert manager 62 assigns the responding divert control module 52 an address that is subsequently communicated to that particular divert control module 52. These address assignments remain resident in divert manager 62 and do not need to be communicated to the tier three controller.

An alternative method for initializing each divert control module 52 is to use ultra-wideband (UWB) signals that are emitted from, or detected by, each divert control module 52. Such signals would be transmitted in conjunction with a plurality of other UWB transceivers that are positioned within the facility at known locations. From these UWB communications, each divert control module 52 could automatically determine its location within the facility, as well as its relative position with respect to the other divert control modules 52. This relative location could be determined by direct UWB communications with the other divert control modules. Once each divert control module 52 knows its location with respect to the others, they may automatically assign themselves their own unique address based on their positional order down sortation bed 74, or some other criteria. Divert manager 62 would thus not need to assign addresses, but could instead simply pre-define the position on the sortation bed 74 as having a particular address. UWB signals can also be used in control system 70 in any of the ways described in commonly assigned U.S. patent application Ser. No. 60/318,029, filed Sep. 10, 2001, the disclosure of which is hereby incorporated herein by reference.

In addition to the divert control modules 52, divert manager 62 also controls or supervises at least one motor control module 54. Motor control modules 54 control the one or more motors 58 used to power sortation bed 74. While other types of motors may be used, each motor control module 54 preferably controls a linear induction motor 58. As illustrated in FIG. 9 and is disclosed in International Publication No. 02/26602, each motor control module 54 may include a conventional, off-the-shelf linear induction motor driver 110 and an addressable interface 112. The motor drivers 110 may be standard variable frequency drives, or other types of drives. The addressable interfaces 112 provide interfaces to the drivers 110 that allow divert manager 62 to communicate with selected motor control modules 54. Each linear motor 58 exerts a force on the movable slats 80 by way of a ferrous plate embedded within each slat 80. The amount of force exerted by each motor is controllable by divert manager 62. Divert manager 62 sends commands to each motor control module 54 instructing the motor control module to drive the associated motor 58 at a particular level. Divert manager 62 is also in communication with slat sensor 106 which, in addition to providing identification of each individual slat, also provides a speed indication. The speed indication is determined by counting the frequency at which gaps between slats are detected. The width of each slat is known, as well as the gaps between them, so that the frequency with which gaps are detected can be converted into a speed. Divert manager 62 sends out commands to each motor control module 54 so that the slats 80 of sortation bed 74 move at a given speed. The given speed is chosen based on information that divert manager 62 receives from the tier three controller regarding the desired level of throughput in the overall conveyor system.

Motor control modules 54 may also be in communication with at least one motor sensor 114. Motor sensor 114 may be a conventional thermistor used to determine if a particular motor 58 is overheating. The signals from each thermistor are transmitted to the associated motor control module 54 which interprets the signals, and which has stored the acceptable operating temperatures for the particular type of motor 58 controlled by motor control module 54. Based on this information, motor control module 54 sends status information to divert manager 62 about the operating condition of its motor 58. If motor control module 54 determines that its associated motor 58 is overheating, divert manager 62 may decrease the level at which that particular motor is to be driven. In such a case, divert manager 62 is programmed to issue commands to one or more of the other motor control modules 54 in order to drive those other motors at a higher level in order to make up for the decreased force being produced by the overheating motor. When the overheated motor temperature has sufficiently fallen, motor control module 54 can command the motor to resume its prior level of force production and make a corresponding decrease in the force being produced in the other motors. Divert manager 62 thus determines how each motor 58 will be driven in order to effect the proper speed of sortation bed 74 while at the same time varying the loading of each motor, as necessary, in order to keep them at acceptable operating temperatures. Whenever a motor 58 persistently runs at too high of a temperature, divert manager 62 may send a status message to tier three controller 40 for inclusion in diagnostic reporting that is communicated to the human operators of the system.

As discussed above, divert manager 62 contains a variety of different information and intelligence that allows it to deal with various errors and other situations without having to wait for instructions from tier three controller 40. These include diverting errors, heating issues with motors, jammed or blocked branch conveyors, and other situations. By including the intelligence necessary to deal with these situations within divert manager 62, tier three controller 40 can be freed from having to address many of the details that it otherwise would have had to deal with. Moreover, by including such information and intelligence in divert manager 62, modifications to the method of controlling sortation bed 74 can usually be made without having to make modifications to the tier three controller 40. It will be understood by one skilled in the art that other sensors and/or actuators can be used besides those depicted and described herein.

Figure 12:
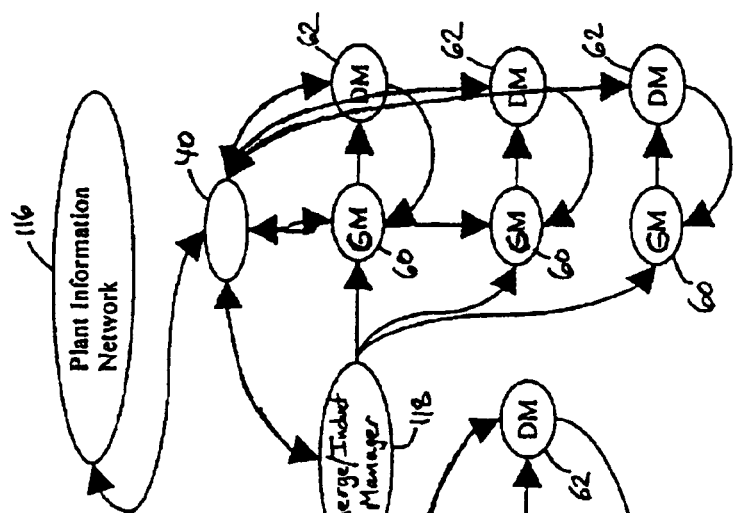
FIG. 12 is a schematic view of still another control architecture of the present invention.
Figure 11:
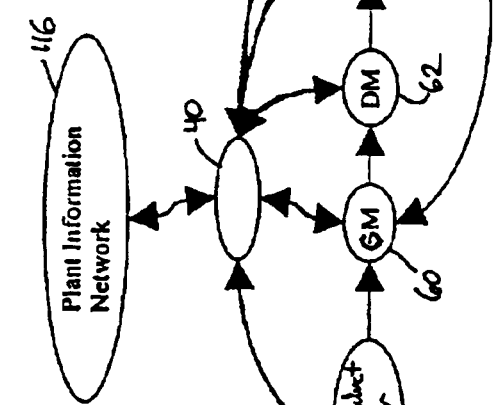
FIG. 11 is a schematic view of another control architecture of the present invention.
Figure 10:
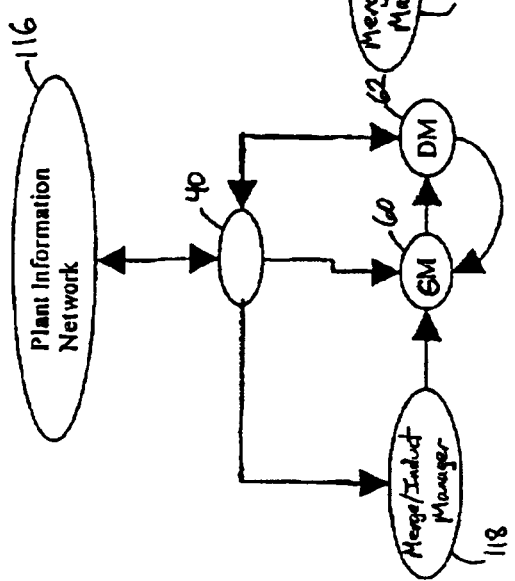
FIG. 10 is a schematic view of a control architecture according to one aspect of the invention.

The tiered control system of the present invention can take on a variety of different architectures, several of which are illustrated schematically in FIGS. 10–12. Each of the architectures includes a plant information network 116, which is a network that typical plants and facilities maintain to monitor the flow of material throughout the facility. The illustrated architectures are equally viable without such a network 116. If present, however, the network 116 could be in communication with a tier three controller 40, as indicated by the lines and arrows in the illustration. The tier three controller 40 would be in communication with various other components in a manner that depends on the particular architecture.

In FIG. 10, the tier three controller 40 is in communication with one merge/induct manager 118, one gapping manager 60 (GM), and one divert manager 62 (DM). The merge/induct manager 118 oversees the merging and induction of multiple incoming conveyor lines. It controls the speed at which articles on these conveyors are moved, as well as the grouping of articles into slugs. Furthermore, it controls the manner in which articles from different incoming conveyor lines are merged onto fewer conveyor lines. Gapping manager 60 controls the spacing or gaps between articles after they have been inducted and merged. The divert manager 62 controls the diverting of articles on a sortation bed, such as sortation bed 74. This control may be carried out in the manner previously described.

In the architecture of FIG. 10, tier three controller 40 controls and oversees the operation of managers 118, 60, and 62. Merge/induct manager 118 inducts and merges the incoming conveyor lines into a single conveyor line. Thereafter, the articles traveling on the single conveyor line are properly gapped under the controlled gapping manager 60. The articles are then appropriately diverted downstream of that on a single sortation bed.

FIG. 11 illustrates a cascaded divert control architecture. In this architecture the articles are inducted and merged into a single conveyor line in a manner that is controlled by merge/induct manager 118. A gapping manager 60 thereafter ensures that the articles are properly gapped. Downstream of the gapping manager 60 are three separate sortation beds arranged serially. Each one of these sortation beds is under the control of a separate divert manager 62. Such separate divert managers and sortation beds may be useful where the required physical length is beyond what can feasibly be manufactured using only a single sortation bed.

FIG. 12 illustrates a parallel control architecture. In this architecture merge/induct manager 118 inducts and merges incoming articles down to three separate conveyor lines. Each of these conveyor lines space the articles traveling thereon under the control of a separate gapping manager 60. Each of the conveyor lines also includes a separate sortation bed under the control of a separate divert manager 62. The parallel diverting architecture of FIG. 12 can be especially useful in increasing the throughput of a diverting system as multiple sortation beds can be sorting articles simultaneously.

The tiered control system of the present invention creates a modularized control system in which each subsystem is more independent as a stand-alone piece than in the past. The subsystems can be functionally tested without the need of interconnection to the main system, thereby allowing for the easy integration of new technologies, modifications in scalability and cost reduction and the more cost-effective making of simple repairs. Initial development is also enhanced by the ability to get a subsystem operating that requires less hardware buildup while modeling the necessary characteristics of the full system environment.

While the present invention has been described in terms of the preferred embodiments depicted in the drawings and discussed in the above specification, it will be understood by one skilled in the art that the present invention is not limited to these particular preferred embodiments, but includes any and all such modifications that are within the spirit and scope of the present invention as defined in the appended claims.

What is claimed is:

1. A conveyor sortation system comprising:
a sortation bed having a plurality of generally parallel slats that define a conveying surface that carries articles to be sorted, and a propulsion system propelling said slats in a direction of conveyance;
a plurality of pushers movably coupled to said slats, and at least one diverter switch adapted to initiate divert of at least one of said pushers along said slats in a divert direction generally transverse to said direction of conveyance;
first and second pusher sensors for sensing said pushers, said first pusher sensor being upstream of said at least one diverter switch, said second pusher sensor being downstream of said at least one diverter switch;
a first controller in communication with said first and second pusher sensors and said at least one diverter switch, said first controller responsive to said first pusher sensor to activate said at least one diverter switch to initiate a divert of said at least one of said pushers said first controller responsive to said second pusher sensor to determine if said at least one of said pushers actually diverted.

2. The system of claim 1 further including at least one branch conveyor positioned adjacent said sortation bed and an article sensor, said article sensor being adapted to detect the presence of an article that has been diverted off of said sortation bed and onto said branch conveyor.

3. The system of claim 1 including a third pusher sensor downstream of said at least one diverter, said third pusher sensor being adapted to detect whether said switch switches to said diverting state.

4. The system of claim 3 including a slat sensor, said slat sensor being adapted to sense the speed of said slats in the direction of conveyance.

5. The system of claim 1 including a second controller, said second controller in communication with said first controller, said first controller sending a message to said second controller if said at least one diverter switch failed to divert at least one of said pushers.

6. The system of claim 5 further including a third controller, said third controller in communication with said second controller, said third controller communicating to said second controller destinations for articles traveling through the conveyor sortation system.

7. The system of claim 6 wherein said first, second, and third controllers each include a microprocessor.

8. A conveyor sortation system comprising:
   a sortation bed having a plurality of generally parallel slats that define a conveying surface that carries articles to be sorted, said slats being movable in a direction of conveyance;
   a detectable element coupled to at least one of said slats that identifies that particular slat;
   a plurality of pushers movably coupled to said slats, said pushers movable along said slats in a direction generally transverse to said direction of conveyance;
   a plurality of switches capable of selectively assuming a diverting state, said switches initiating at least one of said pushers to move in said generally transverse direction when in said diverting state;
   a slat sensor that detects said detectable element;
   an article sensor that senses articles; and
   a switch controller that activates one or more of said switches into said diverting state based at least partially on when said slat sensor detects said dectable element and when said article sensor senses an article.

9. The system of claim 8 further including a divert manager that sends switch commands to said switch controller, said switch commands specifying times at which said switches should be activated into the diverting state and times when said switches should not be activated into the diverting state.

10. The system of claim 9 wherein said switch command specifies at least one slat whose coupled pusher is to be moved in said transverse direction when said slat reaches said switch.

11. The system of claim 10 wherein said divert manager is adapted to determine which of said plurality of switches should be activated into said diverting state.

12. The system of claim 11 wherein said divert manager assigns an identity to each of said slats in said sortation bed.

13. The system of claim 12 wherein said article sensor is in communication with said divert manager, said divert manager adapted to determine the identity of at least one slat underneath the detected article.

14. The system of claim 8 further comprising:
   a plurality of switch controllers, each of said switch controllers adapted to activate at least one of said switches into said diverting state; and
   a divert manager adapted to send commands to said switch controllers commanding said switch controllers to activate at least one switch into a diverting state, said divert manager further adapted to determine which of said plurality of switch controllers are to receive said commands.

15. The system of claim 14 further comprising a system controller, said system controller in communication with said divert manager, said system controller communicating information about an article's intended destination to said divert manager, said divert manager using said information to determine which of said plurality of switch controllers receive said commands.

16. The system of claim 8 further comprising at least one drive for driving said slats in a direction generally parallel to said direction of conveyance, and at least one drive controller for controlling said drive, said drive controller receiving a speed command from said divert manager, said drive controller outputting a control signal to said drive based on said speed command to cause said slats to move at a speed specified in said speed command.

17. The system of claim 16 wherein said drive controller includes a variable frequency driver and said drive includes a linear induction motor.

18. The system of claim 8 including at least one sensor for sensing said pushers and a first controller, said first controller adapted to determine if said at least one of said pushers actually diverted.

19. A conveyor sortation system comprising;
   a sortation bed having a plurality of generally parallel slats that define a conveying surface that carries articles to be sorted, and a propulsion system propelling said slats in a direction of conveyance;
   a plurality of pushers movably coupled to said slats, and a plurality of diverter switches adapted to initiate divert of at least one of said pushers along said slats in a direction generally transverse to said direction of conveyance;
   a first controller in communication with said diverter switches, said first controller adapted to activate said diverter switches in response to a divert command; and
   a second controller in communication with said first controller, said second controller sending a divert command to said first controller to divert at least one of said pushers, said divert command specifying which of said diverter switches to activate in order to divert an article; and
   said first controller sending status information to said second controller.

20. The system of claim 19 wherein said divert commands include a slat identifier that identifies when said divert command is to commence.

21. The system of claim 19 further including at least one branch conveyor positioned adjacent said sortation bed and a sensor said sensor, being adapted to detect the presence of an article that has been diverted off of said sortation bed and onto said branch conveyor.

22. The system of claim 19 including a sensor, wherein said sensor is adapted to detect at least one of said pushers.

23. The system of claim 19 including a sensor, wherein said sensor is adapted to detect whether said switch switches to said diverting state.

24. The system of claim 19 including a sensor, wherein said sensor is adapted to sense the speed of said slats in the direction of conveyance.

25. The system of claim 19 further including a third controller, said third controller in communication with said second controller, said third controller communicating to said second controller destinations for articles traveling through the conveyor sortation system.

26. The system of claim 25 wherein said first, second, and third controllers each include a microprocessor.

27. The system of claim 19 including at least one sensor for sensing said pushers, wherein said first controller is adapted to determine if said at least one of said pushers actually diverted.

* * * * *

UNITED STATES PATENT AND TRADEMARK OFFICE
CERTIFICATE OF CORRECTION

PATENT NO. : 6,951,274 B2 Page 1 of 1
APPLICATION NO. : 10/163788
DATED : October 4, 3005
INVENTOR(S) : David W. Zeitler, Andrew R. Black and Clyde Miin-Arng Ko It is certified that error appears in the above-identified patent and that said Letters Patent is hereby corrected as shown below:

Column 19
Line 24, Cliam 8, "dectable" should be --detectable--.

Signed and Sealed this

Twenty-sixth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,951,274 B2 | Page 1 of 1 |
| APPLICATION NO. | : 10/163788 | |
| DATED | : October 4, 2005 | |
| INVENTOR(S) | : David W. Zeitler, Andrew R. Black and Clyde Miin-Arng Ko | |

It is certified that error appears in the above-identified patent and that said Letters Patent is hereby corrected as shown below:

Column 19
Line 24, Cliam 8, "dectable" should be --detectable--.

This certificate supersedes Certificate of Correction issued December 26, 2006.

Signed and Sealed this

Thirtieth Day of January, 2007

JON W. DUDAS
*Director of the United States Patent and Trademark Office*